United States Patent
Komatsu

(10) Patent No.: US 11,344,958 B2
(45) Date of Patent: May 31, 2022

(54) CUTTING INSERT

(71) Applicant: TUNGALOY CORPORATION, Fukushima (JP)

(72) Inventor: Naoki Komatsu, Waki (JP)

(73) Assignee: TUNGALOY CORPORATION, Iwaki (JP)

(*) Notice: Subject to any disclaimer, the term of this patent is extended or adjusted under 35 U.S.C. 154(b) by 165 days.

(21) Appl. No.: 16/848,722

(22) Filed: Apr. 14, 2020

(65) Prior Publication Data
US 2020/0331077 A1 Oct. 22, 2020

(30) Foreign Application Priority Data

Apr. 18, 2019 (JP) .............................. JP2019-079331
Mar. 9, 2020 (JP) .............................. JP2020-039878

(51) Int. Cl.
*B23C 5/20* (2006.01)

(52) U.S. Cl.
CPC ...... *B23C 5/202* (2013.01); *B23C 2200/0438* (2013.01); *B23C 2200/203* (2013.01); *B23C 2200/366* (2013.01)

(58) Field of Classification Search
CPC ...... B23C 2200/0438; B23C 2200/203; B23C 2200/208; B23C 2200/366; B23C 5/109; B23C 5/207; B23C 5/1027; B23C 5/20; B23C 5/202; B23C 5/2247
See application file for complete search history.

(56) References Cited

U.S. PATENT DOCUMENTS

| | | | | |
|---|---|---|---|---|
| 5,221,162 A * | 6/1993 | Okawa | ................... | B23C 5/1045 407/40 |
| 5,486,073 A * | 1/1996 | Satran | ................... | B23C 5/2221 407/113 |
| 5,593,255 A * | 1/1997 | Satran | ..................... | B23C 5/109 407/113 |
| 5,893,683 A * | 4/1999 | Johnson | ................ | B23C 5/2221 407/42 |
| 6,102,630 A * | 8/2000 | Flolo | ..................... | B23C 5/1045 407/103 |
| 6,149,355 A * | 11/2000 | Fouquer | ................ | B23C 5/1045 407/113 |
| 7,004,689 B2 * | 2/2006 | DeRoche | ................ | B23C 5/109 407/33 |
| 7,771,142 B2 * | 8/2010 | Sheffler | ................. | B23C 5/2221 407/113 |

(Continued)

FOREIGN PATENT DOCUMENTS

EP 0585800 A1 * 3/1994 ............. B23C 5/109
EP 2 412 464 A1 2/2012
(Continued)

*Primary Examiner* — Sara Addisu
(74) *Attorney, Agent, or Firm* — Studebaker & Brackett PC

(57) ABSTRACT

A cutting insert which is excellent in both cutting edge strength and chip evacuation is provided. A corner edge of the cutting insert is formed in an arc shape. In a direction perpendicular to a rotation axis of a body, a width of the corner edge is 40% or more and 50% or less of a width of the cutting insert. An upper surface has a negative land which is formed along a cutting edge and has a negative angle. The angle of the negative land increases from one end, which is connected to an inner cutting edge, of both ends of the corner edge toward the other end.

4 Claims, 10 Drawing Sheets

(56) References Cited

U.S. PATENT DOCUMENTS

| | | | |
|---|---|---|---|
| 7,905,689 B2 * | 3/2011 | Dufour | B23C 5/207 407/113 |
| 7,972,091 B2 * | 7/2011 | Svenningsson | B23C 5/109 407/113 |
| 8,696,263 B2 * | 4/2014 | Saji | B23C 5/207 407/113 |
| 9,700,947 B2 * | 7/2017 | Dufour | B23C 5/1045 |
| 10,207,342 B2 * | 2/2019 | Mura | B23C 5/109 |
| 11,097,362 B2 * | 8/2021 | Men | B23C 5/2221 |
| 2004/0071515 A1 * | 4/2004 | Arvidsson | B23C 5/207 407/113 |
| 2004/0253062 A1 * | 12/2004 | Schleinkofer | B23C 5/2221 407/48 |
| 2006/0013661 A1 * | 1/2006 | Long | B23C 5/109 407/113 |
| 2006/0188347 A1 * | 8/2006 | Kratz | B23B 27/145 407/113 |
| 2006/0228179 A1 * | 10/2006 | Alm | B23B 27/145 407/113 |
| 2006/0275088 A1 * | 12/2006 | Lehto | B23C 5/2221 407/40 |
| 2009/0311057 A1 * | 12/2009 | Yoshida | B23C 5/2221 407/113 |
| 2010/0003090 A1 * | 1/2010 | Johansson | B23C 5/202 407/113 |
| 2011/0076106 A1 * | 3/2011 | Morrison | B23C 5/1045 407/102 |
| 2017/0008099 A1 * | 1/2017 | Touma | B23C 5/109 |
| 2017/0066065 A1 | 3/2017 | Burtscher | |
| 2018/0036811 A1 * | 2/2018 | Saji | B23C 5/109 |
| 2018/0339350 A1 * | 11/2018 | Mura | B23C 5/207 |
| 2019/0118275 A1 * | 4/2019 | Oikawa | B23C 5/2217 |
| 2019/0283151 A1 * | 9/2019 | Jansson | B23C 5/2221 |
| 2020/0070259 A1 * | 3/2020 | Nagafuchi | B23C 5/1045 |

FOREIGN PATENT DOCUMENTS

| | | | | |
|---|---|---|---|---|
| JP | 2000042821 A | * | 2/2000 | B23C 5/2213 |
| JP | 2015-168010 A | | 9/2015 | |
| JP | 2017-506165 A | | 3/2017 | |
| WO | WO-2009034633 A1 | * | 3/2009 | B23C 5/2221 |
| WO | 2010/110009 A1 | | 9/2010 | |

\* cited by examiner

CUTTING INSERT

CROSS-REFERENCES TO RELATED APPLICATIONS

This application relates to and claims priority from Japanese Patent Application No. 2020-039878, filed on Mar. 9, 2020 and Japanese Patent Application No. 2019-079331, filed on Apr. 18, 2019, the entire disclosure of which is incorporated herein by reference.

BACKGROUND

Field

The present invention relates to a cutting insert used for cutting, and more particularly to a cutting insert attached to an indexable cutting tool used for milling.

Description of Related Art

There is a desire to design a cutting edge having high strength with which a work material having high hardness can be machined.

SUMMARY

When an axial rake angle (axial rake) is set to be a negative angle (negative), the rake angle reduces at both a tip and an outer circumference of a milling tool, and cutting edge strength can increase. On the other hand, when the axial rake angle is set to be a negative angle, chips are easily discharged toward a lower side (the tip side) of the milling tool, and clogging of chips, rubbing of the chips on a work surface, and the like easily occur. On the other hand, when a rake surface of a cutting insert is formed into a flat surface and the axial rake angle is set to be a positive angle, a true rake angle increases as a distance from the tip of the milling tool increases, and the cutting edge strength decreases.

An object of the present invention is to provide a cutting insert which is excellent in both cutting edge strength and chip evacuation.

A cutting insert according to an aspect of the present invention is a cutting insert which is mounted on a body rotating about a rotation axis and constitutes an indexable cutting tool together with the body. The cutting insert includes a lower surface mounted on a seat surface of the body, an upper surface opposite to the lower surface, and a circumferential surface connecting the lower surface to the upper surface. A cutting edge is formed at a ridge line at which the upper surface and the circumferential surface intersect. The cutting edge has an inner cutting edge and a corner edge. The corner edge is formed at a position farther from the rotation axis than the inner cutting edge and is connected to the inner cutting edge. The corner edge is formed in an arc shape in a plan view seen from a direction facing the upper surface. In a direction perpendicular to the rotation axis, a width of the corner edge is 40% or more and 50% or less of a width of the cutting insert. The upper surface has a negative land which is formed along the cutting edge and has a negative angle, and a flat surface which is connected to the negative land and parallel to the lower surface. The angle of the negative land increases from one end, which is connected to the inner cutting edge, of ends of the corner edge toward the other end.

According to this aspect, the angle of the negative land formed adjacent to the corner edge has a smaller value at a portion located closer to the tip of the milling tool. By providing the negative land of which a land angle gradually changes to a positive side toward a side away from the tip of the milling tool, the cutting edge strength can be enhanced while the chip evacuation is be improved.

In the above aspect, the cutting edge of the cutting insert further has a linear wiper edge which is connected to the corner edge and parallel to the rotation axis. In the ridge line in the wiper edge, the linear ridge line of the upper surface preferably intersects the wiper edge at an obtuse angle.

According to this aspect, since the wiper edge wipes a machined surface of the corner edge, roughness of the machined surface is improved. In the linear ridge line, since the linear ridge line of the upper surface and the wiper edge intersect at an obtuse angle, the linear ridge line coming into contact with a work surface and deteriorating roughness of the machined surface can be prevented in advance.

In the above aspect, it is preferable that the cutting insert further include a through hole penetrating from the upper surface to the lower surface, and when the upper surface is viewed from above, a proportion of the flat surface in an area excluding the through hole from the upper surface is preferably 90% or more.

When there is unevenness on the upper surface, restrictions on how to move a grindstone when grinding the cutting insert occur. According to this aspect, since most of the upper surface is formed of a flat surface, grinding is easily performed. It can be manufactured with higher precision than a cutting insert having a chip breaker or the like formed on the upper surface.

According to the present invention, it is possible to provide a cutting insert which is excellent in both cutting edge strength and chip evacuation.

DETAILED DESCRIPTION

Figure 1:
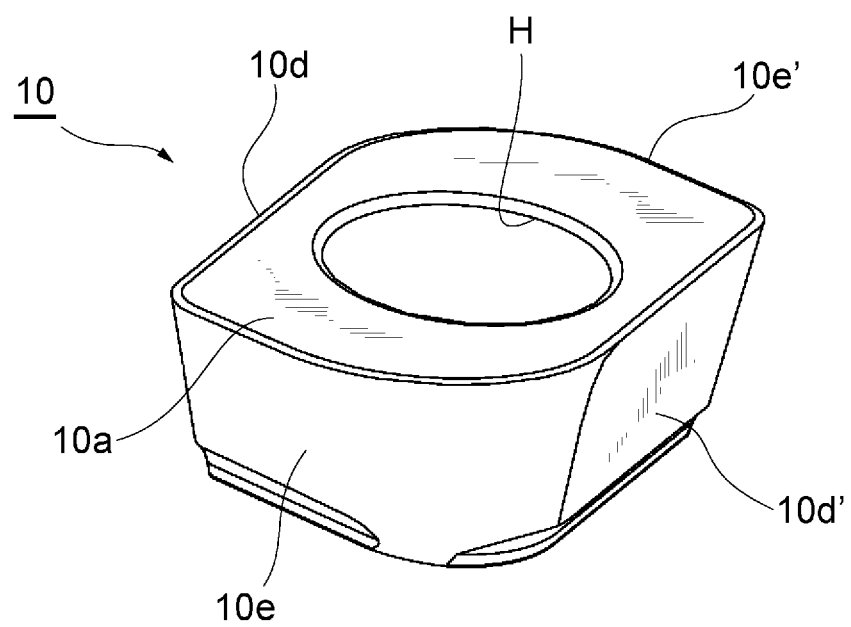
FIG. 1 is a perspective view showing an example of a cutting insert according to one embodiment of the present invention.

A preferred embodiment of the present invention will be described with reference to the accompanying drawings.

Also, in each of the drawings, components denoted by the same reference numerals have the same or similar configurations. In a cutting insert 10 of the present invention, whole parts of cutting edges 10f, 10g, and 10m are disposed at a substantially constant height from a lower surface 10b (see FIGS. 4 and 5). A negative land 10q provided along a corner edge 10f is formed such that an angle thereof increases from θ1 to θ2 from one end 12, which is connected to an inner cutting edge 10g, to the other end 13 (see FIGS. 6 and 7). By providing the negative land of which a land angle gradually changes to a positive side toward a side away from a tip of a milling tool, cutting edge strength can be enhanced while chip evacuation can be improved. Hereinafter, each configuration will be described in detail with reference to FIGS. 1 to 10.

Figure 2:
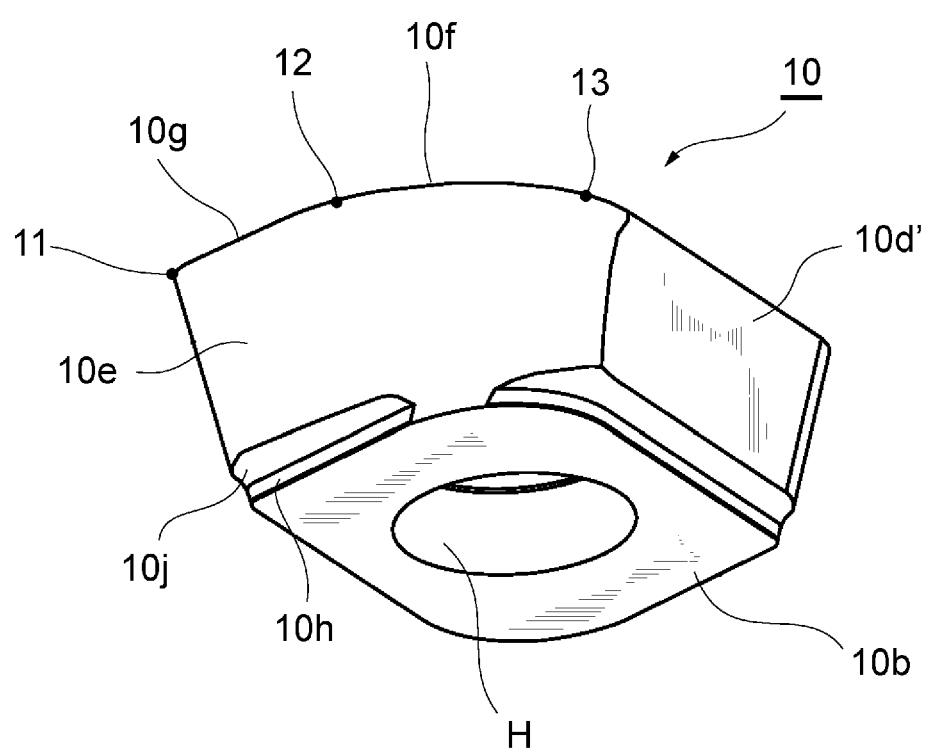
FIG. 2 is a perspective view of the cutting insert shown in FIG. 1 seen from below.

FIGS. 1 and 2 are perspective views showing an example of the cutting insert 10 according to one embodiment of the present invention. As shown in FIGS. 1 and 2, the cutting insert 10 includes an upper surface 10a, the lower surface 10b opposite to the upper surface 10a, and circumferential surfaces 10d, 10d', 10e, and 10e' connecting the upper surface 10a to the lower surface 10b.

The circumferential surfaces include a pair of substantially flat side surfaces 10d and 10d' and a pair of front surfaces 10e and 10e' providing connection between the pair of side surfaces. In the following description, one of the pair of side surfaces may be referred to as a first side surface 10d, and the other may be referred to as a second side surface 10d'. Similarly, one of the pair of front surfaces may be referred to as a first front surface 10e, and the other may be referred to as a second front surface 10e'.

Figure 3:
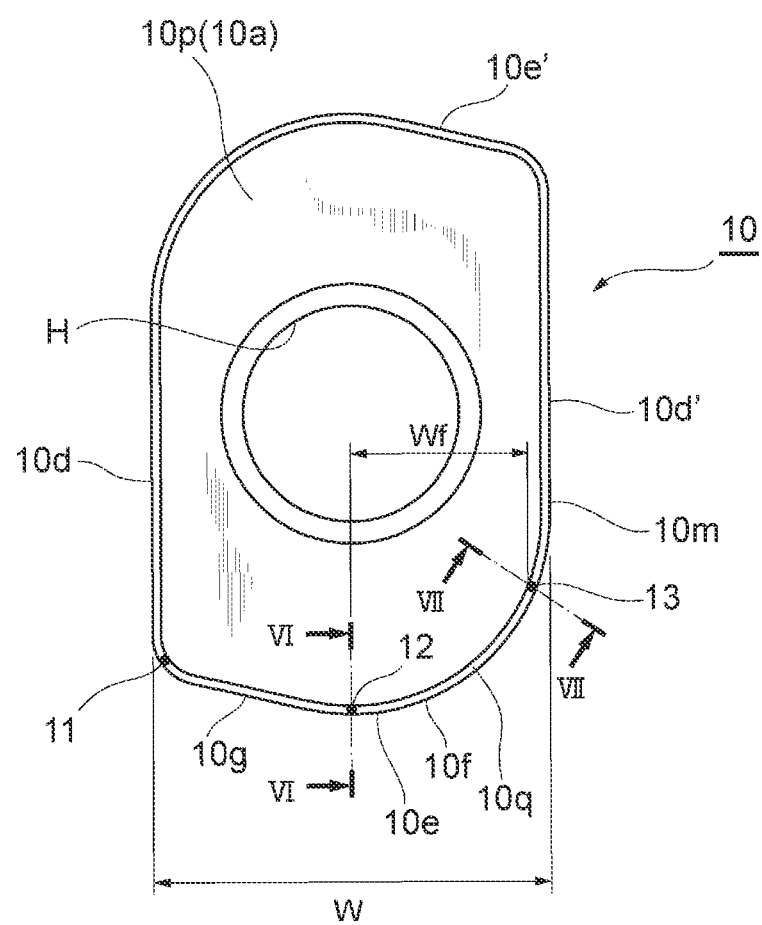
FIG. 3 is a top view of the cutting insert shown in FIG. 1 seen from above.

FIG. 3 is a top view of the cutting insert 10 from the upper surface 10a. As shown in FIG. 3, a ridge line at which the upper surface 10a and the first side surface 10d intersect is formed in a straight line shape. Similarly, a ridge line at which the upper surface 10a and the second side surface 10d' intersect is formed in a straight line shape parallel to the ridge line of the first side surface 10d. As shown in FIG. 3, an interval between the ridge lines, formed in the straight line shapes, of the first and second side surfaces 10d and 10d' is defined as a width W of the cutting insert 10. The width W of the cutting insert 10 is, for example, 4 to 4.5 mm.

In the illustrated example, the lower surface 10b of the cutting insert 10 is formed in a planar shape. A through hole H to penetrate the upper surface 10a and the lower surface 10b is formed in a central part of the cutting insert 10. The cutting insert 10 is fixed to a body B by screwing a clamp screw penetrating the through hole H with a female screw provided on a seat surface of the body B of an indexable cutting tool. In this case, the cutting insert 10 is fixed to the body B such that the side surface 10d side is close to a rotation axis AX of the body B and the side surface 10d' side is far from the rotation axis AX of the body B (see FIG. 9). The body B will be described later in detail with reference to FIGS. 8 to 10.

Figure 4:
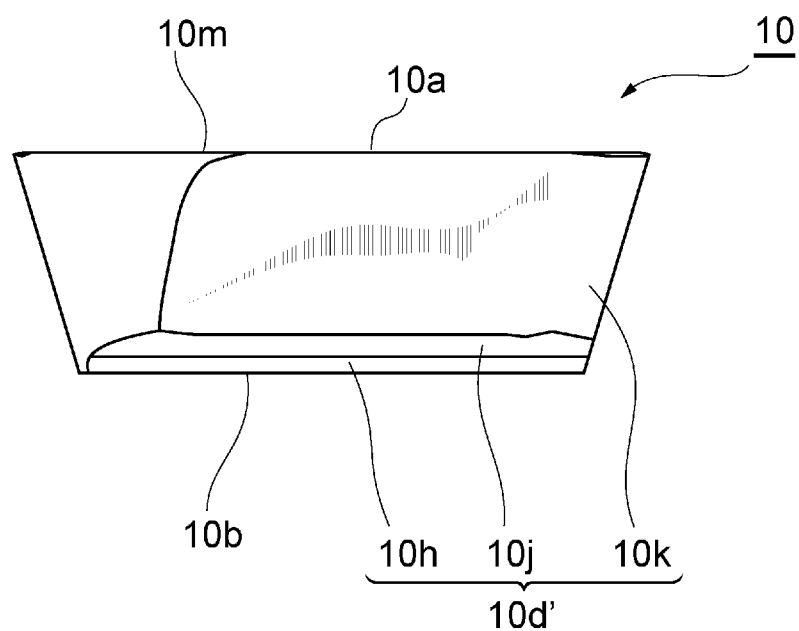
FIG. 4 is a side view of the cutting insert shown in FIG. 1 seen from a circumferential surface (a second side surface part)
Figure 5:
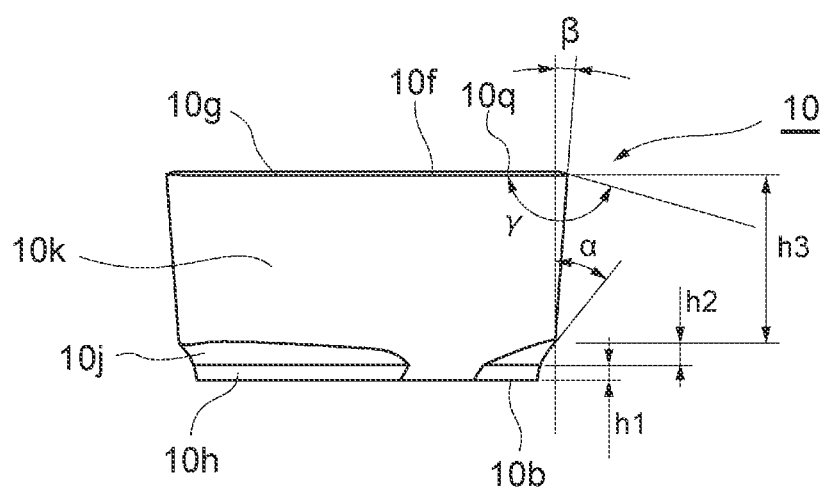
FIG. 5 is a side view of the cutting insert shown in FIG. 1 seen from a circumferential surface (a second front surface part)

FIG. 4 is a side view of the cutting insert 10 from the second side surface 10d' of the circumferential surfaces. FIG. 5 is a side view of the cutting insert 10 from the second front surface 10e of the circumferential surfaces. As shown in FIGS. 4 and 5, the circumferential surfaces 10d, 10d', 10e, and 10e' of the cutting insert 10 include a vertical part 10h which is connected to the lower surface 10b and perpendicular to the lower surface 10b, a connection part 10j which is connected to the vertical part 10h and expands such that a cross-sectional area thereof parallel to the lower surface 10b increases toward a side away from the lower surface 10b, and an inclined part 10k which is connected to the connection part 10j and expands such that a cross-sectional area thereof parallel to the lower surface 10b increases toward a side away from the lower surface 10b.

In the following description, an angle at which the circumferential surfaces are inclined with respect to a central axis of the through hole H is referred to as an inclination angle. In addition, the angle formed between the central axis of the through hole H and the circumferential surfaces is obtained as a complementary angle of the angle formed by a direction vector of the central axis and a normal vector of the circumferential surfaces. As shown in FIG. 5, the circumferential surfaces 10d, 10d', 10e, and 10e' of the connection part 10j have a larger inclination angle (a first inclination angle α) than the circumferential surfaces of the vertical part 10h. Therefore, an increase rate of the cross-sectional area is large. On the other hand, the circumferential surfaces of the inclined part 10k have a smaller inclination angle (a second inclination angle 1) than the circumferential surfaces of the vertical part 10h. Therefore, the increase rate of the cross-sectional area is small.

Further, heights in a direction perpendicular to the lower surface 10b increase in the order of the vertical part 10h, the connection part 10j, and the inclined part 10k. In addition, a height h3 of the inclined part 10k is larger than a sum h1+h2 of a height h1 of the vertical part 10h and a height h2 of the connection part 10j.

In other words, the cutting insert 10 has a constricted shape from the upper surface 10a to the lower surface 10b, and has a structure in which the inclined part 10k contracts such that the cross-sectional area gradually decreases from the upper surface 10a toward the lower surface 10b, the connection part 10j then contracts such that the cross-sectional area decreases greatly toward the lower surface 10b, and the vertical part 10h is connected to the lower surface 10b while a constant cross-sectional area is maintained. Also, the inclination angles of the connection part 10j and the inclined part 10k need not be constant. However, an average value of the inclination angle of the connection part 10j and an average value or a representative value of the inclination angle of the inclined part 10k have a magnitude correlation therebetween.

As shown in FIGS. 1 and 2, a cutting edge is formed on at least a part of the ridge line at which the upper surface 10a and the first front surface 10e intersect. The cutting edge includes a corner edge 10f and an inner cutting edge 10g. Similarly, the corner edge 10f and the inner cutting edge 10g are formed as a cutting edge at the ridge line at which the upper surface 10a and the second front surface 10e' intersect. The cutting insert 10 has a structure that is 180° axially symmetric with respect to the center axis of the through hole H. That is, the first front surface 10e and the second front surface 10e' have substantially the same shape and function. For that reason, the first front surface 10e will be described in detail as a representative, and repeated descriptions of the second front surface 10e' will be omitted.

The corner edge 10f is provided at a corner part of the cutting insert 10 and is formed to have a predetermined curvature when viewed from a direction facing the upper surface 10a. In other words, the corner edge 10f is formed in an arc shape. The curvature of the corner edge 10f can be selected in accordance with a specification of a corner R to be machined. For example, when the specification of the corner R is 2 mm, the cutting insert 10 in which the corner edge 10f has a predetermined radius of curvature (for example, slightly less than 2 mm) may be selected such that the corner R after machining in consideration of a rotation locus of the corner edge is 2 mm.

In the present embodiment, as shown in FIG. 3, the corner edge 10f which is larger and has a larger curvature than usual is formed. In the illustrated example, a width Wf of the corner edge 10f is 40% or more and 50% or less of the width W of the cutting insert 10 in the direction perpendicular to the rotation axis AX of the body B. More specifically, when viewed from the direction facing the upper surface 10a, the corner edge 10f is formed from the side surface 10d' to a position of 40% to 50% in a direction of the width W (a direction connecting the first side surface 10d and the second side surface 10d'), and the radius of curvature is formed, for example, to be 50% or less of the width W.

In addition, in the example shown in FIGS. 3 and 5, the inner cutting edge 10g is formed continuously with the corner edge 10f. The inner cutting edge 10g includes the other end 12 connected to the corner edge 10f, and one end 11 connected to the first side surface 10d formed substantially linearly when viewed from the direction facing the upper surface 10a.

As shown in FIGS. 4 and 5, the upper surface 10a is formed to be flat and parallel to the lower surface 10b. In other words, a ridge line of the upper surface 10a including the corner edge 10f and the inner cutting edge 10g is positioned at substantially the same height from the lower surface 10b over the entire circumference thereof. More specifically, the upper surface 10a has a flat surface 10p whose height (distance) from the lower surface 10b is constant, and the negative land 10q surrounding the flat surface 10p.

Ridge lines at which the negative land 10q and the circumferential surfaces 10d, 10d', 10e, and 10e' intersect have a height from the lower surface 10b which is substantially equal to that of the flat surface 10p and are slightly lower than the flat surface 10p. That is, distances from the lower surface 10b between all parts of the cutting edges 10f, 10g, and 10m formed on the ridge lines and the upper surface 10a are substantially constant. A difference in height between the cutting edge at the highest position from the lower surface 10b and the cutting edge at the lowest position from the lower surface 10b is, for example, 1 mm or less.

In the example shown in FIG. 4, a wiper edge 10m is formed on a side opposite to the inner cutting edge 10g with the corner edge 10f interposed therebetween. The wiper edge 10m is formed to be much shorter than the corner edge 10f and the inner cutting edge 10g. The other end of the wiper edge 10m is connected to a linear ridge line of the upper surface 10a. The ridge line and the wiper edge 10m intersect at an obtuse angle γ of almost 180° at an inner angle, as shown in FIG. 5.

Figure 6:
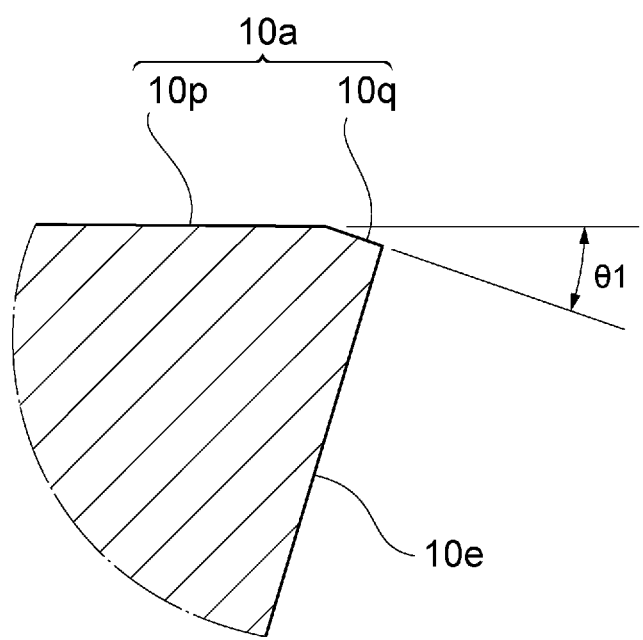
FIG. 6 is a cross-sectional view along line VI-VI in FIG. 3.
Figure 7:
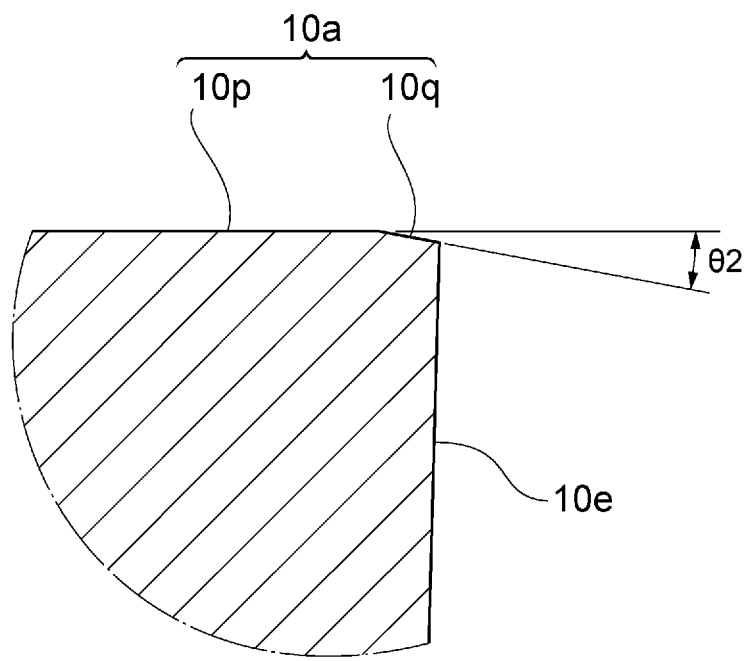
FIG. 7 is a cross-sectional view along line VII-VII in FIG. 3.

As shown in FIGS. 6 and 7, the negative land 10q having a negative angle (θ1 to θ2) is formed adjacent to the cutting edge on the upper surface 10a. FIG. 6 is a cross-sectional view along line VI-VI in FIG. 3. FIG. 7 is a cross-sectional view along line VII-VII in FIG. 3. As shown in FIGS. 6 and 7, the angle of the negative land 10q adjacent to the corner edge 10f gradually increases to approach a positive value from one end 12 connected to the inner cutting edge 10g toward the other end 13 connected to the wiper edge 10m.

In the illustrated example, an angle θ1 of the negative land 10q at the end 12 on the inner cutting edge 10g side shown in FIG. 6 is −20°. The angle of the negative land 10q gradually increases from θ1 toward the end 13 connected to the wiper edge 10m. An angle θ2 of the negative land 10q at the end 13 on the wiper edge 10m side shown in FIG. 7 is −8°.

In addition, the upper surface 10a is configured of the flat surface 10p, in which a chip breaker or the like is not formed, in most of the portion excluding the through hole H and the negative land 10q. A proportion of the flat surface 10p to the upper surface 10a is 90% or more.

Figure 8:
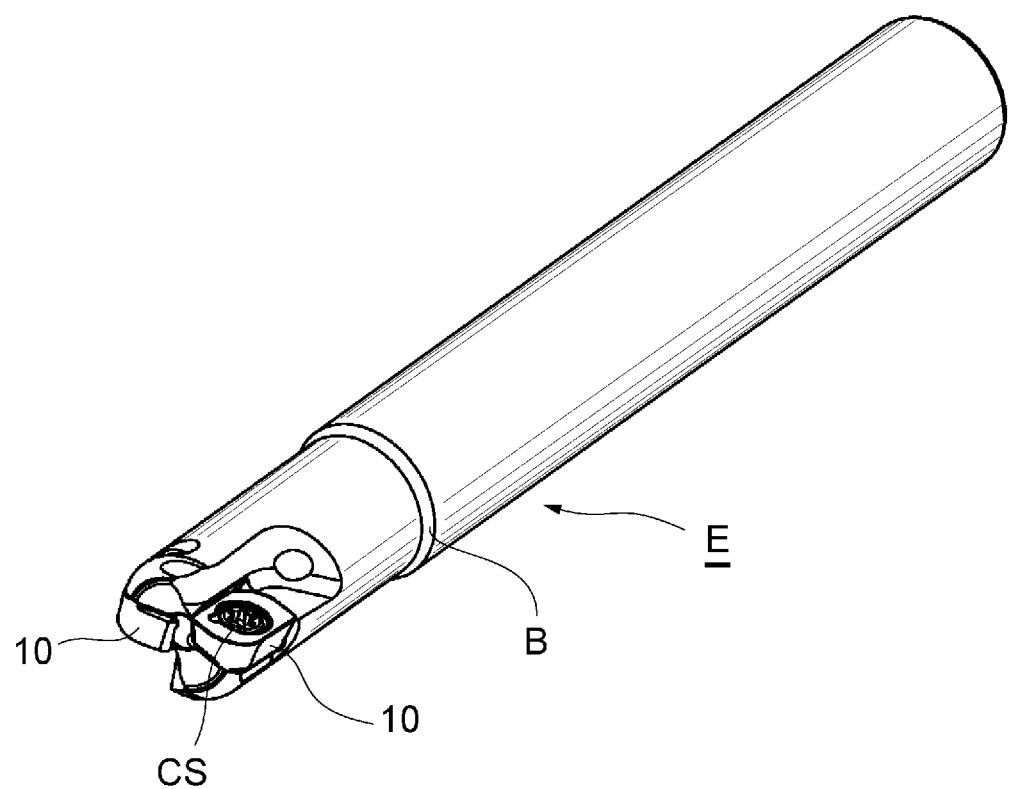
FIG. 8 is a perspective view showing an example of an end mill provided with the cutting insert of the present embodiment.
Figure 9:
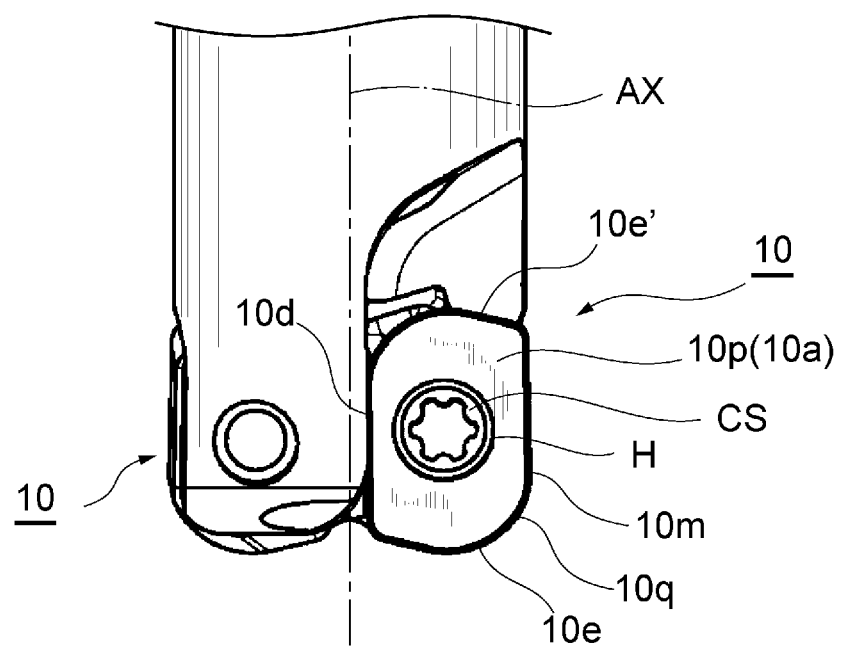
FIG. 9 is a diagram of a tip part of the end mill shown in FIG. 8 seen from an upper surface side of the cutting insert.
Figure 10:
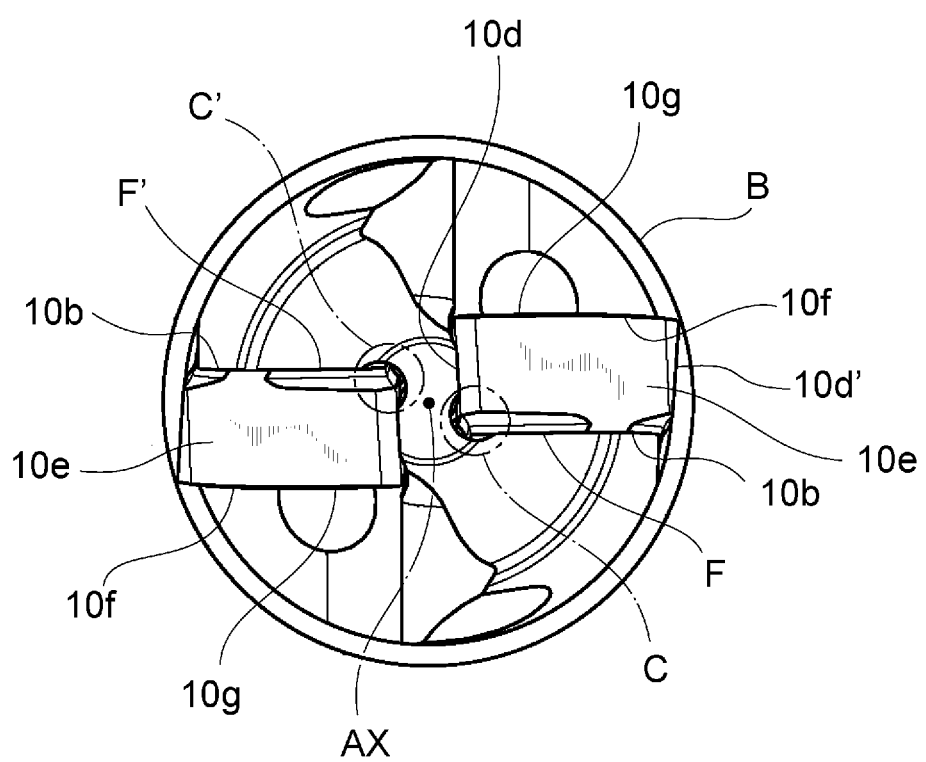
FIG. 10 is a diagram of the tip part of the end mill shown in FIG. 8 seen from a direction parallel to a rotation axis of a body.

FIG. 8 is a perspective view showing an example of an end mill E on which two cutting inserts 10 are mounted, FIG. 9 is a diagram of a tip part of the end mill E, including the tip and the vicinity thereof, when viewed from a direction perpendicular to the rotation axis AX, and FIG. 10 is a diagram of the tip part of the end mill E when viewed from the direction of the rotation axis AX. The end mill E is an example of the indexable cutting tool. The end mill E shown in FIGS. 8 to 10 is a small-diameter end mill E having a tool diameter of 8 mm to 20 mm and can be used, for example, for machining a mold.

As shown in FIGS. 8 to 10, two seat surfaces F and F' for mounting the cutting inserts 10 are formed on a cylindrical body B at the tip part of the end mill E. Female screws are formed in the seat surfaces F and F'. By screwing a clamp screw CS penetrating the through hole H of the cutting insert 10 with the female screw, the lower surface 10b of the cutting insert 10 is pressed against each of the seat surfaces F and F', and each cutting insert 10 is fixed to the body B. A base end of the end mill E opposite to the tip part is fixed to a machine tool (not shown).

In this case, the front surface 10e faces in the same direction as the rotation axis AX. As described above, the cutting insert 10 is mounted on the body B such that the side surface 10d is close to the rotation axis AX and the side surface 10d' is far from the rotation axis AX. Therefore, the corner edge 10f and the inner cutting edge 10g are present from an outer circumferential side toward a center of the end mill E.

Hereinafter, a structure for increasing rigidity of the body B will be described. The cutting insert 10 according to the present embodiment contributes to increasing the rigidity of the body B. Since the width W of the cutting insert 10 is extremely thin, that is, 4 to 4.5 mm, the body B on which the cutting insert 10 is mounted is also thin. As a volume of the body B decreases, the rigidity of the body B also decreases.

In addition, in order to securely bring the side surface of the cutting insert into contact with a wall surface of a tip seat of the body when the cutting insert is mounted on the body, a relief (a recessed part) is formed around a corner part connecting the seat surface and the wall surface of the tip seat. The inventors of the present application have focused on the point that removing the corner part of the tip seat to form the relief has an effect on the rigidity of the body.

Since the cutting insert 10 according to the present embodiment is provided with the inclined part 10k and the connection part 10j, an edge of the lower surface 10b is moved toward a center side of the lower surface 10b as compared with a typical cutting insert in which the inclined part 10k and the connection part 10j are not provided. For this reason, as shown in FIG. 10, it is possible to reduce the relief formed at each of corner parts C and C' of the tip seat of the body B on which the cutting insert 10 is mounted, that is, to increase a cross-sectional area of the body B. Therefore, the rigidity of the body B can be increased.

Further, since the width W of the cutting insert 10 is very narrow, that is, 4 to 4.5 mm, each contact area of the seat surface F and the seat surface F' of the tip seat is also restricted. When the contact area is too small, the cutting insert cannot be stably mounted on the body B. Since the cutting insert 10 is provided with the vertical part 10h following the inclined part 10k, an area of the lower surface 10b can be increased as compared with a case in which there is no vertical part 10h. Therefore, a large contact area of the cutting insert with each of the seat surface F and the seat surface F' of the chip seat can be secured.

Also, since a circumferential surface of the inclined part 10k having a relatively small inclination angle can be brought into contact with the wall surface of the tip seat, the cutting insert 10 can be supported more stably as compared with a case in which a circumferential surface having a large inclination angle is brought into contact with the wall surface of the tip seat. Therefore, the cutting insert 10 according to the present embodiment can achieve both improvement in rigidity of the body B and stable mounting.

Next, effects of the present embodiment will be described. The angle (θ1 to θ2) of the negative land 10q formed adjacent to the corner edge 10f has a smaller value (for example, θ1) at a portion located closer to the tip of the milling tool. By providing the negative land of which the land angle gradually changes to a positive side toward a side away from the tip of the milling tool, cutting edge strength can be enhanced while chip evacuation can be improved.

As a second (secondary) effect of the present embodiment, the cutting insert 10 is disposed on the tool body B to form a positive axial rake angle, and accordingly, in the case of cutting a work material that is not a hard material, if the cutting insert 10 is replaced such that the rake angle becomes a positive angle, the tool body B can be shared in cutting of a high-hardness material and cutting of other work materials.

In addition, since the wiper edge 10m is connected to the corner edge 10f, roughness of a machined surface of a standing wall is improved. Since the linear ridge line connected to the wiper edge 10m and the wiper edge 10m intersect at an obtuse angle, contact of the linear ridge line with a workpiece is avoided. Therefore, it is possible to prevent a situation in which the linear ridge line comes into contact with a work surface and deteriorates roughness of the machined surface.

Further, grooves and irregularities such as a chip breaker are not formed on the upper surface 10a, and most of the upper surface 10a is formed of the flat surface 10p. Accordingly, when the negative land 10q is formed by grinding, a degree of freedom in moving a grindstone increases, and manufacturing costs decrease. That is, the cutting insert 10 can be manufactured with higher precision than a cutting insert having a complicated shape on which a chip breaker or the like is formed.

The present invention can be variously modified without departing from the gist thereof. For example, some components of one embodiment may be combined with other embodiments within a range of an ordinary creativity of those skilled in the art.

What is claimed is:

1. A cutting insert which is to be mounted on a body rotating around a rotation axis and constitutes an indexable cutting tool together with the body, the cutting insert comprising a lower surface mounted on a seat surface of the body, an upper surface opposite to the lower surface, a circumferential surface connecting the lower surface to the upper surface, and a through hole penetrating from the upper surface to the lower surface, wherein a cutting edge is formed at a ridge line at which the upper surface and the circumferential surface intersect, the cutting edge including an inner cutting edge having a straight line shape and a corner edge having an arc shape, the corner edge is located farther from the rotation axis than the inner cutting edge when the cutting insert is mounted on the body, and the corner edge is connected to the inner cutting edge, the corner edge in a plan view from a direction facing the upper surface has a width of 40% or more and 50% or less of a width of the cutting insert in a direction perpendicular to the rotation axis, the upper surface includes a negative land which is formed along the cutting edge and has a negative angle, and a flat surface which is connected to the negative land and parallel to the lower surface, when the upper surface is viewed from above, a proportion of the upper surface which is a flat surface in an area excluding the through hole from the upper surface is 90% or more, and the negative angle of the negative land decreases from one end of both ends of the corner edge, the one end being connected to the inner cutting edge, toward the other end.

2. The cutting insert according to claim 1, wherein the cutting edge further includes a linear wiper edge which is connected to the corner edge and parallel to the rotation axis, and in the ridge line in the wiper edge, a linear ridge line of the upper surface intersects the wiper edge at an obtuse angle.

3. The cutting insert according to claim 1, wherein the negative land is formed to enclose the flat surface, the ridge line is the intersection of the negative land and the circumferential surface, and is located at the same height from the lower surface all around the ridge line, and a difference in height between the cutting edge at the highest position from the lower surface and the cutting edge at the lowest position from the lower surface is 1 mm or less.

4. The cutting insert according to claim 2, wherein the negative land is formed to enclose the flat surface, the ridge line is the intersection of the negative land and the circumferential surface, and is located at the same height from the lower surface all around the ridge line, and a difference in height between the cutting edge at the highest position from the lower surface and the cutting edge at the lowest position from the lower surface is 1 mm or less.

\* \* \* \* \*